Jan. 30, 1940.  W. WORTH  2,188,801
OIL DILUTION SYSTEM
Filed Feb. 11, 1937
FIG. 1.
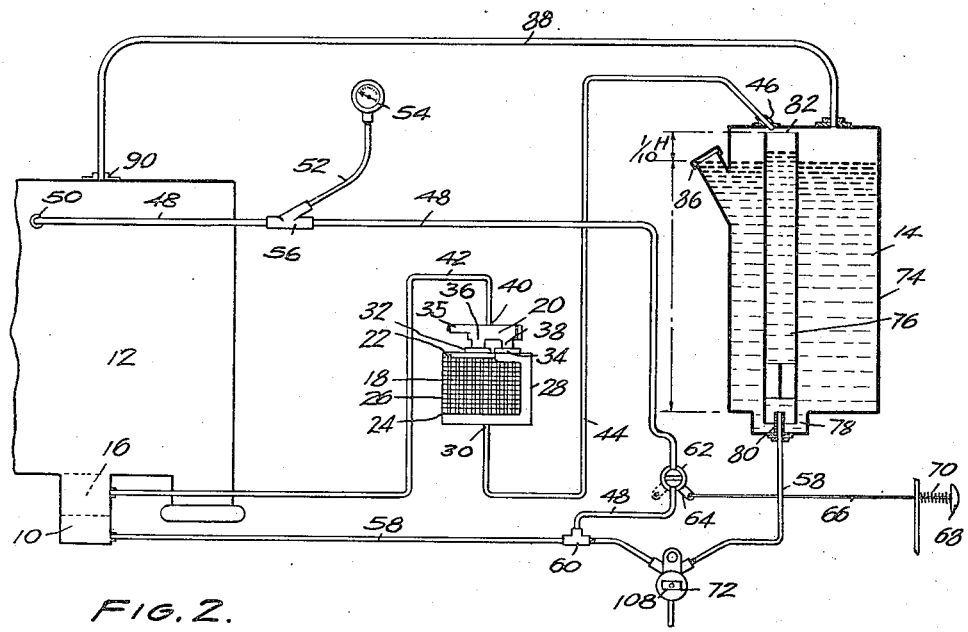
FIG. 2.
FIG. 3.
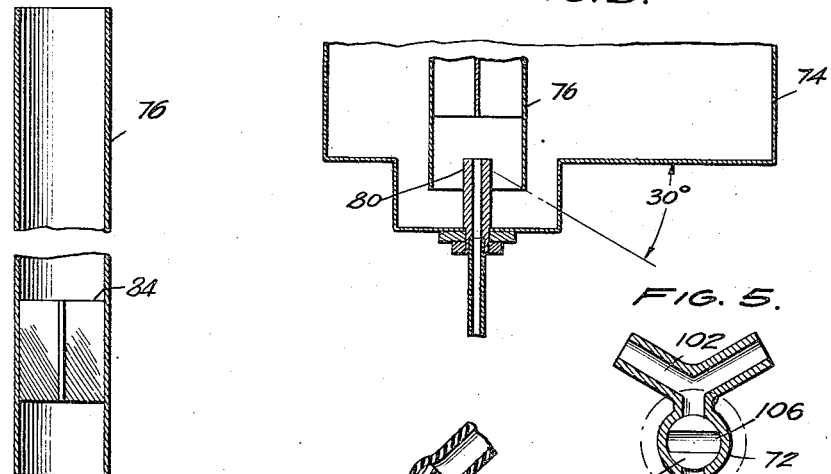
FIG. 4.
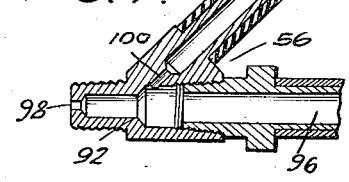
FIG. 5.
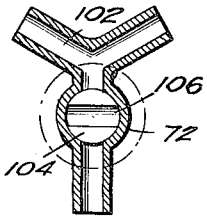
INVENTOR
WELDON WORTH
BY
ATTORNEYS Patented Jan. 30, 1940

2,188,801

UNITED STATES PATENT OFFICE 2,188,801

OIL DILUTION SYSTEM

Weldon Worth, Dayton, Ohio

Application February 11, 1937, Serial No. 125,257

26 Claims. (Cl. 184—6)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the lubrication system for internal combustion engines and especially to lubrication systems for engines of the type which are used in aircraft. Specifically, it deals with the problem of supplying the oil, at all times, at viscosities which provide better lubrication and facilitates starting in cold weather.

Prior to my invention it has been extremely difficult to start aircraft engines in cold weather and it has been necessary to idle the engines for long periods on the ground to warm the oil to a point where it will properly lubricate the engine. In extremely cold weather it is sometimes even impossible to start the engine without a very complicated heating arrangement. It is obvious that the long delays in starting and warm-up and poor lubrication during all of this process are extremely undesirable.

It was also necessary, prior to my invention, to drain the oil at intervals of twenty to forty hours of engine operation to avoid excessive sludge accumulation in the oil.

It is an object of my invention to facilitate the starting of the engine in cold weather by controlling the viscosity of the oil in the engine before it is started.

Another object of my invention is to eliminate the long warm-up periods heretofore necessary by supplying the oil to the engine at a viscosity which will permit almost immediate operation at full power with adequate lubrication and oil circulation. A still further object of my invention is to supply proper lubrication to the engine immediately and thus avoid excessive wear that results during the warm-up period and at other times when the oil does not circulate properly because of its viscosity.

Another object of my invention is to provide an oil tank which eliminates the necessity of changing the engine oil and draining the tanks from time to time as is now the practice.

With the foregoing and other objects in view, which will appear as the description proceeds, the invention consists of certain new and novel improvements in oil dilution systems, which will be hereinafter more fully illustrated in the accompanying drawing and more particularly pointed out in the appended claims.

Referring to the drawing, in which numerals of like character designate similar parts throughout the several claims:

Figure 1 is a diagrammatic illustration of a lubrication system incorporating my invention;

Figure 2 is an enlarged sectional view of a hopper incorporated in the oil tank;

Figure 3 is an enlarged sectional view of an oil tank outlet;

Figure 4 is an enlarged cross sectional view of a special fitting that is connected to the fuel system; and Figure 5 is an enlarged sectional view of a drain cock that is connected to the oil system.

I have illustrated my invention in connection with an internal combustion engine which is provided with an oil circulating system including an oil cooler circuit.

The oil circulating system shown by way of illustration in Figure 1 comprises an oil pump 10 connected between an engine 12 and a source of supply 14 for supplying oil from the source of supply to the engine under pressure; a pump 16 for withdrawing scavenged oil from the engine and returning the same to the source of supply, and an oil cooler device 18 having a plurality of branches or paths through which the oil is passed prior to its return to the source of supply, the ratio of oil passing through each branch depending upon the viscosity thereof.

The oil cooler device 18 forms a portion of the viscosity control system covered by my co-pending application, Number 88,413, Viscosity control valve, filed July 1, 1936. It consists of a viscosity regulating valve 20 and an oil cooler or radiator 22. For a further detailed description of a device of this character, reference is made to Patent No. 2,140,735, issued to H. B. Clarke et al., December 20, 1938.

The radiator, as illustrated herein, is of well-known construction and per se does not constitute a part of my invention. The radiator essentially consists of a casing 24 enclosing a core 26 which constitutes a restricted passage for the flow oil and a duct 28 which constitutes an unrestricted passage for the flow oil. These passages have a common outlet 30 and are connected by means of the viscosity regulating valve 20 in such a manner that under different operating conditions the oil entering the regulator valve will by-pass one or the other of said passages.

The viscosity regulating valve 20 is preferably constructed as a unitary structure that is readily detachably connected to the upper end of the oil cooler 22 by suitable means such as screws passing through flanges 32 and 34 formed integral with the valve casing 35 and around the exhaust outlets 36 and 38 that register with the restricted and unrestricted passages 26 and 28, respectively. The regulator casing 35 is also provided with an inlet port 40 that registers with an inflow oil line 42, connected with the pump 16, while the outlet 30 of the oil cooler device 18 is connected with an outflow oil line 44 that registers with an inlet 46 of the source of supply 14. A line 48 connects at 50 with a source of engine fuel supply, under a normal pressure of 3 to 5 pounds, where the fuel pressure gage is normally connected. A fuel pressure line 52 to a fuel pressure gage 54 is then connected to a forked fitting 56 which is inserted in the line 48 between the connection 50 and its connection at the other end to an inflow oil line 58 with an ordinary T fitting 60. Also interposed in the line 48 is a shut-off cock 62, opened by an operating lever 64, which is actuated by a push rod 66 when a hand control 68, which is usually located at the cockpit, is actuated by pushing against a spring 70. The spring 70 will always move the control to shut off the valve when the hand control 68 is not actually held in an open position. In the inflow oil line 58 there is also shown a Y-shaped drain cock 72 which is not in itself a part of this invention. For convenience it may be desired to incorporate the T fitting 60 and the shut-off cock 62 with the Y-shaped cock 72 to provide ease of installation and compactness, although this arrangement is not illustrated.

Within an oil tank 74, utilized to hold the source of supply 14, there is provided a hopper 76 which comprises a cylindrical tube extending from just below the inlet 46 into an oil sump 78 at the bottom of the tank where an outlet 80 is located. The inlet 46 is so located with respect to the hopper 76 that the oil issuing from the inlet 46 impinges substantially, tangentially and downwardly against the inside of the hopper so as to force the oil against the side of the hopper and give it a rotating motion, both of which tend to separate any air from the oil. There is a free overflow space 82 between the top of the hopper 76 and the top of the oil tank 74. Near the bottom of the hopper 76 and above the outlet 80 are some straightening vanes 84, the purpose of which is to stop any rotating motion before the oil reaches the outlet 80 and thus preclude any rotating vortices whereby air might be allowed to enter the inlet 46. There is a free opening between the outlet 80 and the hopper 76 which permits the oil to flow freely from the main portion of the tank into the oil sump 78, beneath the hopper 76, and up around the outlet 80 into the inside of the hopper 76. An oil tank filler opening 86 is so located to provide expansion space at the top of the oil tank and to limit the normal oil level with respect to the hopper so that the spill-over level from the top of the hopper will be at least 10% of the distance from the maximum filling level, determined by the oil tank filler opening 86, to the top of the outlet 80. A vent line 88 permits return of the air and vapors from the top of the oil tank 74 to the crankcase of the engine 12 through a connection 90.

In Figure 3 the extension of the outlet 80 into the hopper 76 is defined by the angle of 30° This is not critical, but to insure the proper operation, the relation of the opening of the outlet 80 is such that if the oil tank 74 is tilted 30° in any direction the level of the opening will be above the level of any part of the bottom opening of the hopper 76 which communicates with the main portion of the oil tank 74 through the oil sump 78.

Figure 4 is a section of the forked fitting 56 which shows the details. This fitting may either be screwed into the connection 50 where the fuel pressure gage 54 is normally taken off or may be inserted in the line. In any event the end 92 is connected to the fuel pressure, an opening 94 is then connected to the fuel pressure line 52 and an opening 96 receives the line 48 which connects to the shut-off cock 62. Incorporated in this fitting is the small metering orifice 98 which meters the flow of gasoline into the oil system when the shutoff cock 62 is opened. In normal systems having approximately 3 pounds fuel pressure the metering orifice 98 is about .062 of an inch in diameter. To protect the fuel pressure gage 54 against the fluctuation in fuel pressure, there is normally interposed a metering orifice 100 having an opening of about .040 of an inch in diameter, which is also included in the forked fitting 56 in series with the other opening 98. Engines equipped with the lubricating system involving my invention of the oil dilution system as herein set forth, have only the hand control 68 which is used to operate the system and obtain the advantages herein described.

In Figure 5, the Y-shaped drain cock 72 is composed of a body 102 and a tapered stem 104. The stem 104 is provided with a passage 106 and a handle 108 (shown in Figure 1), backed by a conventional seating spring not shown.

The advantages of the oil dilution system are primarily important when cold weather is encountered and the oil would otherwise become quite viscous when the engine 12 is shut off and allowed to stand idle. In such cases, before the engine 12 is shut off, the pilot pushes the hand control 68 so as to hold the shut-off cock 62 open for a period of approximately four minutes and during this time the fuel pressure which is transmitted from connection 50 through line 48 will force a predetermined quantity of gasoline through the metering orifice 98, through the shut-off cock 62, and through the T fitting 60 into the inflow oil line 58. Thus the oil coming into the engine 12 will be diluted to a very low viscosity but its lubricating quality is not impaired by the added mixture of gasoline. The hopper 76 in the oil tank 74 has a small volume, approximately one gallon, and will receive this diluted oil when returned from the engine and direct it to the outlet 80 so that this diluted oil will be circulated and recirculated during this four minute period until the thin oil is thoroughly distributed through the engine 12 and approximately the right amount of dilution is obtained. The engine 12 will then be shut off. When in this condition the engine 12 may stand for days in sub-zero weather and when a start is attempted the engine 12 will turn over as freely as it would in summer weather because the oil, which is the main resistance to cranking, has a viscosity as low as would exist on a summer day with normal oil when the engine 12 is warm. As a result, in extremely cold weather, the ordinary starting equipment will turn the engine 12 over at a much higher cranking speed without the usual strain on the starting equipment and when provided with the proper priming and ignition accessories the major obstacles in cold weather starting have been overcome. When the engine 12 is started, the oil supplied to the engine is still diluted and of such viscosity that it circulates readily to all parts of the engine 12 and proper lubrication is obtained immediately and during that period where normally the oil is too thick and too viscous to properly lubricate the engine 12 and in many cases too viscous to maintain the proper oil pressure.

As has been stated before, the description and operation of the viscosity valve 20 and the oil cooler 18 are set forth in my co-pending application, Number 88,413 and in the above referred to Patent No. 2,140,735. The aforesaid are peculiarly adapted to this system. So far as it is within the limit and ability of the oil cooler 18 to regulate the temperature of the oil, the viscosity valve 20 directs the flow of oil either through the cooling element 26 or through the jacket 28 so as to regulate the viscosity of the oil to a constant viscosity by thus controlling the amount of cooling derived from the oil cooler 18. Therefore, irrespective of the amount of dilution in the oil, the oil cooler 18 will be used or by-passed in such a way that the viscosity of the oil will then be regulated within the capacity of the oil cooler 18 to provide the desired lubricating viscosity.

Independent of this control of the viscosity, as the engine warms up and the oil becomes warm, two further factors operate to return the oil to its normal state. First, the fuel which has been added to the oil vaporizes readily in the crankcase at normal operating temperatures and this vaporization returns the oil to its normal working viscosity. In addition to the foregoing, as the small quantity of oil in the hopper 76 is used up by the engine 12, it is replaced by the fresh oil from the main section of the oil tank 74 which has not been diluted and is maintained from the circulating portion of the oil which is held in the hopper 76. The specific arrangement of the inlet 46 and the outlet 80 with the hopper 76 and the oil tank 74 form an important and novel part of the system as a whole by the manner in which they coact together to separate a small quantity of the total oil supply 14 and recirculate this small portion so that the main portion of supply is kept unmingled except as automatically added to the hopper 76 to supply the oil consumed by the engine 12. This is desirable from a lubricating standpoint but is also an invaluable element of this particular system since it segregates the oil thus diluted in the operation of the dilution system and maintains it in the hopper 76 separate from the main oil supply 14.

There have been previous attempts with the hopper type oil tank in which the outlet 80 was at the bottom of the oil tank 74 and did not extend into the hopper 76. Investigation of this type of tank with glass sides reveals that the hot aerated oil from the engine 12 which has a lower density, would not pass through the outlet 80. The heavier more dense oil in the main portion of the tank would flow under the hopper 76 and through the outlet 80 while the oil in the hopper 76 would flow under the bottom edge of the hopper 76 and escape to the surface of the oil in the main portion of the tank 74. The extension of outlet 80 well into the hopper 76 avoids this condition and prevents both the flow of the main supply 14 of oil through the outlet 80 and also prevents the flow of oil in the hopper 76 into the main portion of the oil tank 74. In normal operation the level of the oil in the hopper 76 will be appreciably higher than the level of the oil in the oil tank 74 due to its lesser density so that the total pressure of the two columns may be equal at the level of the outlet 80. The circulating oil returned from the engine 12 accumulates in the hopper 76 and any excess oil returned from the engine 12 will force the level of the circulating oil below the outlet 80 but it is still retained within the confines of the hopper 76 and thus any oil which goes through the outlet 80 is drawn from this circulating oil. When the level in the hopper 76 falls, indicating that a portion of the oil has been consumed and not returned from the engine 12, the level of the unused oil from the main portion of the oil tank 74 will rise in the hopper 76 and a portion of this oil will be drawn through the outlet 80, as make-up oil, until the balance is reestablished.

One important result in engine lubrication aside from a dilution system is achieved with this hopper type oil tank arrangement. The oil supply 14 to the engine 12 never becomes old since it is consumed at such a rapid rate, with respect to the volume of the hopper 76, that the flow of make-up oil from the main portion of the oil tank 74 into this small circulating system maintains the majority of the oil at an average age of three or four hours of engine operation. In some cases there is less than 1% of the oil having five hours of engine operation even though the oil is not drained for several hundred hours. The saving thus obtained by avoiding the necessity for draining and discarding the oil in the oil tank 74 at frequent intervals is obvious. The sump 78 at the bottom of the oil tank 74 forms a natural trap for the collection and separation of any sludge or particles that may accumulate in the circulating system.

When the hand control 68 is in the normal position and the shut-off cock 62 is closed, the fuel pressure will be transmitted through the metering orifice 98 and the metering orifice 100 to the fuel pressure gauge 54, indicating the engine fuel pressure. When the shut-off cock 62 is open the fuel pressure from connection 50 will force a predetermined quantity of fuel through the metering orifice 98 and the open shut-off cock 62 into the inflow oil line 58. During this period the opening 94 through the metering orifice 100 measures the pressure on the low pressure side of the metering orifice 98 and thus the change in reading on the fuel pressure gage between the open and shut position of the shut off cock 62 indicates roughly the pressure drop of the fuel flowing through the metering orifice 98 and gives a clear and positive indication to the pilot that the dilution is in progress.

It is clear that many variations of this system may be incorporated and that many of its elements may be left out without eliminating the essentials of the invention. For example, the system will give satisfactory service without the definite benefits that are derived from the viscosity valve 20 to regulate the flow of oil through the oil cooler 18, and, for example, an electric operated solenoid valve may replace the mechanically operated shut-off cock 62 which is here illustrated.

It is to be further understood that the above described embodiment of the invention is for the purpose of illustrating only and that various other changes may be made therein without departing from the scope and spirit of the invention.

What I claim is:

1. In a lubricating system for use in connection with an internal combustion engine comprising, in combination, a tank provided with a plurality of communicating compartments and having inlet and outlet openings in direct communication with one of said compartments, means providing a lubricant passage from said outlet through said engine and to said inlet including a pump and means for supplying a lubricant thinner than the lubricant contained in said lubricant tank from a source of supply to the suction side of said pump.

2. In a lubricating system for use in connection with an internal combustion engine comprising, in combination, a tank provided with a plurality of communicating compartments and having inlet and outlet openings in direct communication with one of said compartments, means providing a lubricant passage from said outlet through said engine and to said inlet including a pump, and means for injecting a quantity of lubricant thinner than the lubricant contained in said tank to the suction side of said pump, at a rate of flow less than the rate of supply of said pump.

3. In a lubricating system for use in connection with an internal combustion engine comprising, in combination, a tank provided with a plurality of communicating compartments and having inlet and outlet openings in direct communication with one of said compartments, means providing a lubricant passage from said outlet through said engine and to said inlet including a pump, and means for supplying, at will, a quantity of lubricant thinner than the lubricant contained in said tank to the suction side of said pump comprising a source of supply of said thinner lubricant under pressure, a passage for connecting said source to said lubricant passage and manually operated valve means for controlling the supply of said thinner lubricant.

4. In a lubricating system for use in connection with an internal combustion engine comprising, in combination, a tank provided with a plurality of communicating compartments and having inlet and outlet openings in direct communication with one of said compartments and having the outlet and said directly communicating compartment so constructed and arranged as to insure the flow of lubricant from either compartment of said outlet during equalization of the liquid heads in said tank, and means for supplying a lubricant thinner than the lubricant contained in said tank from a source of supply to the suction side of said pump.

5. In a lubricating system for use in connection with an internal combustion engine comprising, in combination, a tank provided with a plurality of communicating compartments and having inlet and outlet openings in direct communication with one of said compartments and having the outlet extending upwardly into said directly communicating compartment to provide therewith a passageway of such size and dimensions as to insure the flow of lubricant from either compartment to said outlet during equalization of the liquid heads in said tank, means including a pump providing a lubricant passage from said outlet to said engine and to said inlet, and means for injecting a quantity of lubricant thinner than the lubricant contained in said tank to the suction side of said pump at a rate of flow less than the capacity of said pump.

6. In a lubricating system for use in connection with an internal combustion engine comprising, in combination, a tank provided with a plurality of communicating compartments and having inlet and outlet openings in direct communication with one of said compartments, means providing a lubricant passage from said outlet through said engine and to said inlet including a pump, means for injecting a quantity of lubricant thinner than the lubricant contained in said tank to the suction side of said pump at a rate of flow less than the capacity of said pump, and means responsive to said rate of flow for indicating when the thinner is being introduced in said lubricant passage.

7. In a lubrication system for internal combustion engines, a tank having an inlet and an outlet, a conduit in communication with said inlet and said outlet, and having communication with the tank through relatively unrestricted openings at each end portion thereof, said outlet communicating with the conduit above the level of the adjoining communication of said conduit with the tank.

8. In a lubrication system for internal combustion engines, a tank having an inlet and an outlet, a conduit between said inlet and said outlet, said conduit having openings of substantial area at both ends, said outlet extending into the conduit and above the level of the adjoining opening in said conduit, and the upper opening of said conduit being disposed substantially above the normal level of the oil in the said tank.

9. In a lubrication system for an internal combustion engine having a closed circuit through which the main lubrication oil circulates, means for regulating the addition of a diluent in the said circuit for changing the viscosity of the lubricant, the flow path of said lubricant circuit being maintained substantially unaltered during the operation of said means.

10. In a lubrication system for an internal combustion engine, a source of supply and a circulating path capable of communication with the said source of supply, means for proportioning the supply of a liquid of different viscosity in the circulating path, and means for obtaining substantial isolation but open communication between the proportioned liquids and the said oil supply.

11. In a lubrication system, for an internal combustion engine, a source of supply, a circulating path capable of communication with the said source of supply, valve means to regulate the addition of the engine fuel as a diluent for controlling the viscosity of the oil in said circulating path and means for substantially isolating but open communication between the diluted oil and the said oil supply.

12. In a lubrication system for internal combustion engines, an oil tank, a circulating path in communication with said tank, means for proportioning the supply of a fluid of different viscosity in said path and means comprising a compartment within the lubricant tank to divide the lubricant within the tank into communicating, circulating and non-circulating components.

13. In a lubricating system for internal combustion engines, a lubricant supply tank having an inlet and an outlet, a circulating path for said lubricant, means for regulating the supply of a diluent to the circulating path and means for segregating the diluted oil from the lubricant supply, said means comprising a conduit in communication with said inlet and said outlet, and having communication with the tank through relatively unrestricted openings at each end portion thereof, said outlet communicating with the conduit above the level of the adjoining communication of said conduit with the tank.

14. A lubricating system comprising in combination, temperature control means for controlling the temperature of the lubricant in said system, viscosity responsive means for regulating said temperature control means to obtain a substantially constant viscosity independent of the temperature of said lubricant and means for supplying to said lubricant, a liquid of different viscosity.

15. A lubricating system comprising in combination, a receptor and means for establishing communication between said source of supply and said receptor including means for controlling the temperature of the lubricant, a viscosity responsive device for regulating said temperature control means to obtain a substantially constant viscosity independent of the temperature of said lubricant, means for supplying to said lubricant a liquid of different viscosity and means for obtaining communication between the circulating lubricant and the source of supply but maintaining them substantially separate.

16. A tank having an inlet and an outlet, means for discharging the oil received at the inlet through the outlet and preventing its mingling with the major portion of the oil in the tank regardless of density variation of said oils, means for supplying oil from a major portion of the oil in the tank to said outlet through a relatively unrestricted effective fluid flow opening, when the quantity received at the inlet is less than the oil required at the outlet.

17. A tank having an inlet and an outlet, means for discharging the oil received at the inlet through the outlet and preventing its mingling with the major portion of the oil in the tank including a hopper having a cylindrical inlet opening, means for supplying oil from a major portion of the oil in the tank to said outlet through relatively unrestricted effective fluid flow opening, when the quantity received at the inlet is less than the oil required at the outlet, means for causing the oil from said inlet to impinge upon the cylindrical surface of said hopper for separating the air from said inlet oil before delivering it to said outlet.

18. A tank having an inlet and an outlet and having a cylindrical conduit between said inlet and outlet communicating therewith and communicating with the tank at both ends, said inlet aligned to direct any incoming fluid against the cylindrical surface of said conduit at the relatively small impinging angle for separating entrained air from the incoming fluid.

19. In a lubricant system, a tank having inlet and outlet openings, a hopper disposed within said tank and extending below and around said outlet and in spaced relation to said outlet and to the bottom wall of said tank to provide an indirect communicating passageway between said outlet opening and the space between the walls of said hopper and said tank, said passageway providing with said outlet opening a vertically disposed reverse path for the flow of lubricant from said space through said outlet.

20. In a lubricating system, a tank having an inlet and outlet openings and a sump surrounding said outlet opening, a hopper disposed within said tank and extending into said sump below said outlet opening and in spaced relation to said sump and outlet opening to provide a vertically disposed communicating passageway.

21. In a lubrication system, a main lubricant reservoir, a lubricant compartment connected to said reservoir through a duct comprising a substantially vertical portion providing with the walls of said compartment a zone of separation between the lubricants in said reservoir and the lubricants in said compartment, said duct communicating with said compartment and said reservoir at a point below the normal lubricant levels therein and means for circulating lubricant through said compartment.

22. In a liquid system, a plurality of sources of supply of liquids of different viscosity, means for proportioning the supply of said liquids of different viscosity to control the viscosity of the circulating liquid, one of said sources comprising a tank having an inlet and an outlet, a compartment associated with said tank having relatively unrestricted communication therewith above and below the normal liquid level therein, the lower of said communications providing with said outlet a vertically disposed reverse path for the flow of lubricant from said compartment to said outlet.

23. In a liquid circulating system having a tank arrangement with inlet and outlet in which the circulated liquid may be changed in density, a compartment having communication with the tank at positions above and below the normal liquid level in said tank, said communication below the normal liquid level forming part of a region in which a zone of separation may exist when there is a difference in density between the liquid in said compartment and said tank, said outlet so positioned with respect to said zone of separation that movement of the zone of separation determines whether the flow through the outlet is from the tank or from the said compartment.

24. In a liquid system, a plurality of liquid compartments, one of said compartments having an inlet and an outlet communicatively connected and with flow therethrough, a communication between said outlet and another compartment, said communication providing a vertical component to a portion of the path of liquid flowing from said other compartment to said outlet, said vertical component being opposite in direction to the vertical component of the flow path of liquid flowing through said compartment to said outlet.

25. In a liquid system, a plurality of liquid compartments, one of said compartments having an inlet and an outlet communicatively connected and with flow therethrough, a communication between said outlet and another compartment, said communication providing a vertical component to a portion of the path of liquid flowing from said other compartment to said outlet, said vertical component being opposite in direction to the vertical component of the flow path of liquid flowing through said compartment to said outlet, and liquid flow straightening means disposed within said first mentioned compartment.

26. In a lubrication system for an internal combustion engine, a reservoir for containing the lubricant supply, and a flow path for supplying the lubricant from said reservoir to said engine and returning it to said reservoir, means for regulating the addition of a diluent to said lubricant while maintaining continuous lubricant flow through said path.

WELDON WORTH.